DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 277

T904,033

MONOAMMONIUM PHOSPHATE PRODUCTION

Robert G. Lee, Lakeside Acres, Florence, Ala. 35630, and Melvin M. Norton, Rte. 1, Virginia Shores, Sheffield, Ala. 35660

Filed May 26, 1972, Ser. No. 257,153
**Int. Cl. C05b *7/00***
U.S. Cl. 71—34
1 Sheet Drawing. 11 Pages Specification

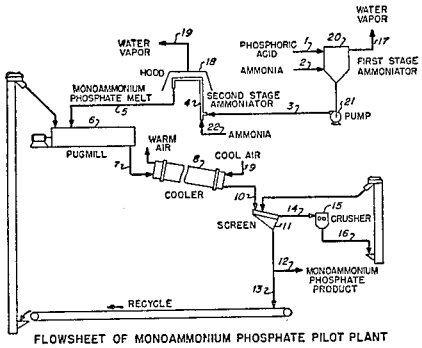

FLOWSHEET OF MONOAMMONIUM PHOSPHATE PILOT PLANT

Process for the production of monoammonium phosphate in finely divided granular form containing up to 30 percent of its $P_2O_5$ as polyphosphate. Orthophosphoric acid typically containing 54 percent $P_2O_5$ is ammoniated in two stages utilizing heat from the reaction to evaporate water and produce essentially anhydrous, molten monoammonium phosphate. The specific procedure followed is a spin-off of Getsinger's teachings in U.S. Pat. 3,382,059. Gaseous ammonia is fed to the first stage at a rate to give 2–6 percent by weight nitrogen in the acid, resulting in temperatures of 220–285° F. and evaporation of up to half of the free water from the acid. The remainder of the ammonia is added to the second stage, consisting of a pipe reactor with length to diameter ratio in the range from 11:1 to 74:1, to increase the $$NH_3:H_3PO_4$$

mole ratio to 0.9–1.1 and to increase the temperature to 350–440° F., thereby evaporating all the remaining free water and possibly some of the chemically combined water from the orthophosphate. The melt is cooled and solidified by mixing with recycled product, typically in a pugmill, at a ratio of recycle to melt of 3 to 1. The product is useful as an intermediate in the production of granular or fluid mixed fertilizers.

MONOAMMONIUM PHOSPHATE PRODUCTION
Filed May 26, 1972
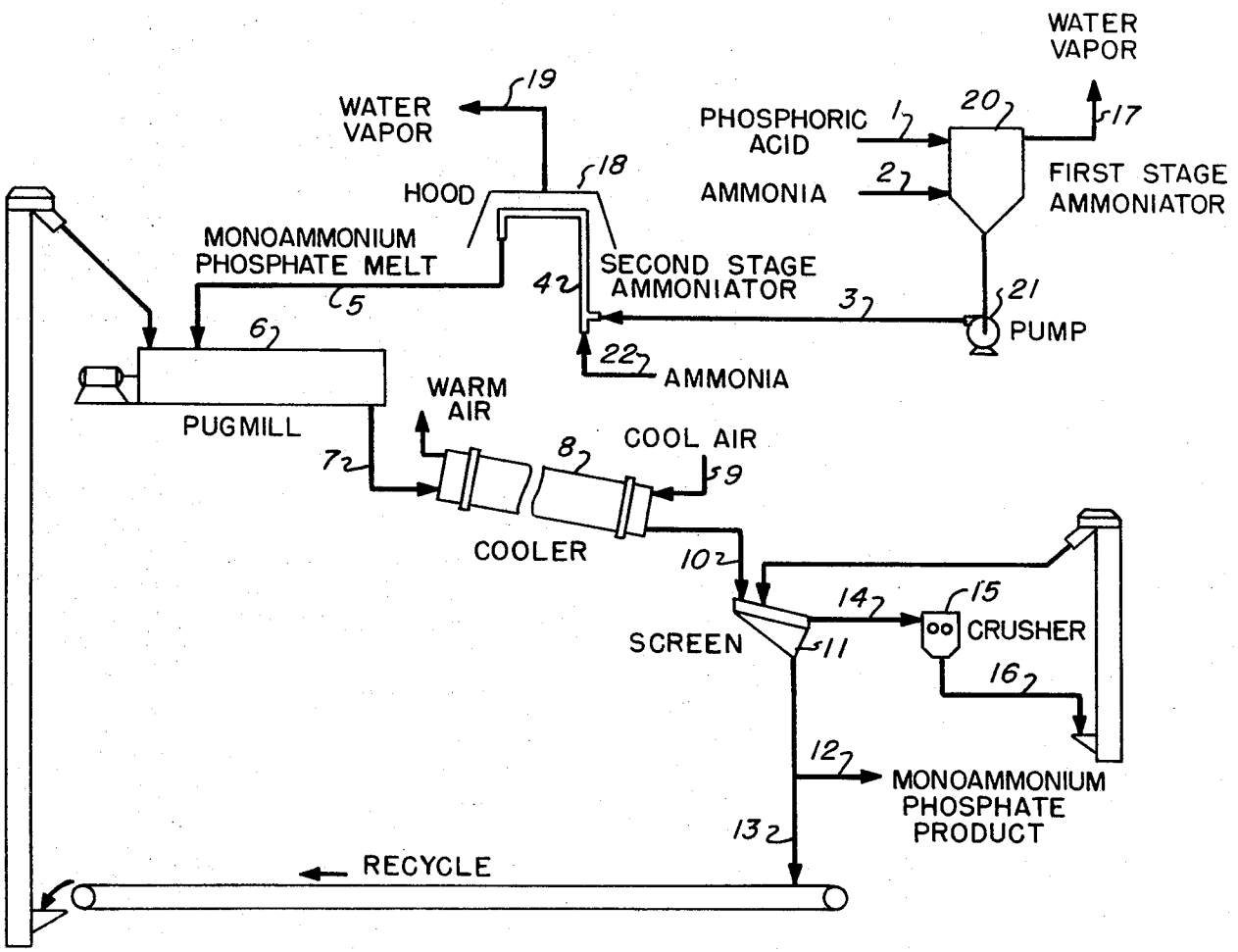
FLOWSHEET OF MONOAMMONIUM PHOSPHATE PILOT PLANT